US009935574B2

(12) United States Patent
Sinner et al.

(10) Patent No.: US 9,935,574 B2
(45) Date of Patent: Apr. 3, 2018

(54) METHOD FOR DETERMINING A ROTOR FREQUENCY AND/OR A ROTOR ANGLE OF A ROTOR OF A RELUCTANCE MACHINE, CONTROL DEVICE, AND DRIVE ASSEMBLY

(71) Applicant: SIEMENS AKTIENGESELLSCHAFT, München (DE)

(72) Inventors: Harald Sinner, Eckental/Eckenhaid (DE); Thilo Weigel, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/523,178

(22) PCT Filed: Oct. 23, 2015

(86) PCT No.: PCT/EP2015/074612
§ 371 (c)(1),
(2) Date: Apr. 28, 2017

(87) PCT Pub. No.: WO2016/066546
PCT Pub. Date: May 6, 2016

(65) Prior Publication Data
US 2017/0366126 A1    Dec. 21, 2017

(30) Foreign Application Priority Data
Oct. 31, 2014    (EP) .................................... 14191318

(51) Int. Cl.
*H02P 21/00* (2016.01)
*H02P 21/18* (2016.01)
(Continued)

(52) U.S. Cl.
CPC .............. *H02P 21/18* (2016.02); *H02P 6/183* (2013.01); *H02P 6/185* (2013.01); *G01P 3/44* (2013.01)

(58) Field of Classification Search
CPC ............................. H02P 25/086; H02K 1/148
See application file for complete search history.

(56) References Cited

U.S. PATENT DOCUMENTS 8,183,816 B2    5/2012 Weigel
2016/0190967 A1*    6/2016 Takano ................. H02P 25/086
318/254.1

OTHER PUBLICATIONS

Fei R. W.: "Analysis of Starting Performance and Frequency Characteristics of Synchronous Reluctance Motors"; Conference Record of the 1996 IEEE Industry Applications Conference—31st IAS Annual Meeting; IEEE Service Center, US; Bd.2; Oct. 6, 1996; pp. 761-768; XP010201385; DOI: 10.1109/IAS.1996.560171; ISBN: 978-0-7803-3544-8; 1996.

(Continued)

*Primary Examiner* — Karen Masih
(74) *Attorney, Agent, or Firm* — Henry M. Feiereisen LLC

(57) ABSTRACT

A method for determining a rotor frequency and/or a rotor angle of a rotor of a reluctance machine, in particular without an amortisseur, is disclosed. The reluctance machine has a stator with a stator winding and the rotor has a magnetically anisotropic rotor core. The method includes applying a temporal sequence of voltage pulses to the stator winding, determining a sequential pulse response of a current flowing in the stator winding, the current being generated as a result of the voltage pulses and a flux being generated from the voltage pulses as a result of the magnetically anisotropic rotor core, and determining the rotor (Continued)

frequency and/or the rotor angle based on the measured sequential pulse response of the electric current by using an evaluating device.

8 Claims, 4 Drawing Sheets

(51) Int. Cl.
*H02P 6/18* (2016.01)
*H02P 6/185* (2016.01)
*G01P 3/44* (2006.01)

(56) References Cited

OTHER PUBLICATIONS

Vagati A. et al; "Design of Low-Torque-Ripple Synchronous Reluctance Motors"; IEEE Transactions on Industry; Applications, IEEE Service Center; Piscataway; NJ, US; Bd. 34; Nr. 4; Aug. 1, 1998; XP011022427; ISSN: 0093-9994; 1998.
Schroedl M et al.; "Sensorless Conrol of Reluctance Machines at Arbitrary Operating Conditions Including Standstill"; IEEE Transactions on Power Electronics, Institute of Electrical and Electronics Engineers, USA; Bd. 9; Nr. 2; Mar. 1, 1994; pp. 225-231; XP002065015; ISSN: 0885-8993; DOI: 10.1109/63.286816; 1994.

* cited by examiner

METHOD FOR DETERMINING A ROTOR FREQUENCY AND/OR A ROTOR ANGLE OF A ROTOR OF A RELUCTANCE MACHINE, CONTROL DEVICE, AND DRIVE ASSEMBLY

CROSS-REFERENCES TO RELATED APPLICATIONS

This application is the U.S. National Stage of International Application No. PCT/EP2015/074612, filed Oct. 23, 2015, which designated the United States and has been published as International Publication No. WO 2016/066546 A1 which claims the priority of European Patent Application, Serial No. 14191318.6, filed Oct. 31, 2014, pursuant to 35 U.S.C. 119(a)-(d).

BACKGROUND OF THE INVENTION

The present invention relates to a method for determining a rotor frequency and/or a rotor angle of a rotor of a reluctance machine. The present invention further relates to a control device for a converter of a reluctance machine. Finally, the present invention relates to a drive assembly.

The present invention is concerned with reluctance machines, in particular synchronous reluctance machines without an amortisseur. Such synchronous reluctance machines without amortisseur, when operated in a field-oriented manner with a frequency converter, exhibit a very good level of efficiency at the same time as good dynamic performance, in particular even under partial load. In contrast with asynchronous machines, there is no rotor time constant to "disrupt" the buildup of dynamic flux, and therefore the synchronous reluctance machine has the advantage of running with utmost energy efficiency under partial load with reduced flux, while at the same time magnetizing quickly in response to demand for load moment. The advantage in respect of the efficiency level is achieved by the reluctance machine primarily due to the elimination of the rotor losses, since the rotor rotates in a steadily synchronous manner with the stator rotating field and does not have any windings. In comparison with a permanently excited synchronous machine, the main benefits are the significantly lower manufacturing costs of the machine and the potential cost savings in respect of the converter protection.

Control devices, as featured in powerful signal processors for example, are now able to model the non-linearities that are characteristic of the reluctance machine and to manage the associated resource-intensive algorithms. Not least for this reason is there now interest in industry for utilizing the advantages of the synchronous reluctance machine in suitable applications. One of the preferred fields of application is drives for pumps or ventilators, for example. These are usually operated as variable-speed drives and have extended running times, resulting in high potential for energy saving. For reasons of cost, such reluctance machines are in most cases configured without a sensor which can measure the rotational speed and/or commutation position. In the case of ventilators in particular, it is necessary to connect to the rotating reluctance machine, quasi "pick up" the drive, and return to the specified delivery rate. When connecting to the turning or rotating synchronous reluctance machine, the converter must be running at the correct rotational speed and phase in relation to the rotor position. Unlike the permanently excited synchronous machine, the rotor consists only of iron (and air), and therefore the usual evaluation of rotational speed and phase by means of measuring the electromotive force is not possible.

Various methods exist for connecting to rotating asynchronous machines and permanently excited synchronous machines without rotational speed and position sensors. In the case of asynchronous machines, it is sufficient to identify the rotational speed, since the phase is not a machine parameter. For this purpose, for example, a current can be impressed at a specified varying search frequency. The search usually starts at a maximum frequency and moves towards zero. The rotational speed to be identified for the machine lies at the point of maximum voltage. It is also possible to use a complete machine model, e.g. in the form of an observer. These have a large coverage area and settle at the machine frequency when supplied with the real machine voltage. In the case of permanently excited synchronous machines, the rotational speed and the phase must be determined. For this purpose, it is possible to measure the electromotive force, which reflects the rotational speed and the phases of the rotor. A test pulse method can also be used, in which a sequence of zero vectors and pulse blocks are generated and the induced pulse currents are evaluated.

As an alternative to the methods described above, another possible method for a synchronous reluctance machine also uses observers, as in the case of an asynchronous machine, which have a large coverage area and settle in phase and angle from a specified start value.

In this regard, the publication "Sensorless Control of Reluctance Machines at Arbitrary Operating Conditions Including Standstill", M. Schroedel et al., IEEE Transactions on Power Electronics, Vol. 9, No. 2, 1994 describes a method for determining a rotor angle of a reluctance machine. Various voltage vectors can be provided for this purpose, in order to determine the reactances in the d-axis and q-axis.

SUMMARY OF THE INVENTION

The object of the present invention is to set forth a solution whereby a reluctance machine can be operated more reliably.

This object is achieved by means of a method, a control device, and a drive assembly in accordance with the respective independent claims. Advantageous embodiments of the present invention are specified in the dependent claims.

A method according to the invention is used to determine a rotor frequency and/or a rotor angle of a rotor of a reluctance machine, wherein said reluctance machine comprises a stator having a stator winding and the rotor having a magnetically anisotropic rotor core. The method comprises applying a temporal sequence of voltage pulses to the stator winding, determining the resulting temporal response sequence of the electric current flowing in the stator winding, which current arises due to a sequence of a magnetic flux, generated as a result of the voltage pulses, interacting with the magnetically anisotropic rotor core, and determining the rotor frequency and/or the rotor angle by means of a control device on the basis of the determined temporal response sequence of the electric current. Furthermore, for the purpose of applying the temporal sequence of voltage pulses, a voltage value of fixed amount and fixed direction and a pulse block are output alternately in each case in sequential repetition using a frequency converter.

The reluctance machine is designed in particular as a synchronous reluctance machine without amortisseur. The stator of the reluctance machine has a three-phase current winding in particular. The rotor consists of a magnetically anisotropic structure, in particular the rotor can have corresponding flux blocking elements, i.e. air-filled regions, which are so arranged as to produce a direction-dependent permeance.

A temporal sequence of voltage pulses is applied to the stator winding. For this purpose, a voltage value of fixed amount and fixed direction and a pulse block can be output alternately in each case in sequential repetition using a frequency converter, for example. The electric voltage causes a temporally varying magnetic flux to develop. As a result of the magnetically anisotropic rotor core, this temporally varying magnetic flux then results in a response sequence of the current, said response sequence being dependent on the angle of the rotor. In particular, this is modulated with information relating to the rotor position angle or rotor angle.

This is based on the finding that, given the magnetic anisotropy of the rotor core, a flux space vector which advances on a circular trajectory relative to the rotor generally results in a distorted elliptical trajectory of a current space vector or current vector. This current space vector can be determined on the basis of the temporal course of the electric current strength. The temporal course of the electric current strength can be captured by means of a current sensor, for example. The control device can be so configured, for example, as to determine the current space vector on the basis of the measured electric current. The rotor frequency of the rotor and/or the rotor angle can then be determined with reference to the geometry of the rotor core and/or the electric current strength that has been determined.

The resulting elliptical path of the current trajectory in rotor coordinates is produced by the superimposition of a positive-phase component and a negative-phase component. The positive-phase component of the current is always oriented in the direction of the flux. The negative-phase component of the current contains the information relating to the rotor angle and therefore allows the rotor frequency and/or the rotor angle to be determined.

Viewed as fixed relative to the stator, and therefore from the perspective of the flux vector which is fixed relative to the stator, the positive-phase component of the current appears as an aperiodic vector or offset displacement in the direction of the flux. The negative-phase component of the current appears as a rotating vector, and rotates on a circular trajectory at double the rotor frequency in the direction of rotation of the advancing rotor angle. The superimposition of both components results in a circular trajectory with offset displacement. In addition to the motor parameters, the offset displacement is dependent on the activation amplitude and can be calculated if the motor parameters are known, or measured if the motor parameters are unknown. If the offset displacement is known, it is then possible on the basis of the measured sequence of the current after the offset displacement has been subtracted to determine the rotor angle and/or the rotor frequency from the remaining sequence of the negative-phase component.

In an embodiment variant, for the purpose of determining the rotor frequency and/or the rotor angle, a phase and/or a frequency of the electric current is prepared by means of a phase control loop of the control device. Such a phase control loop is referred to as a phase-locked loop (PLL). The high signal quality at the output of the phase control loop therefore allows the rotor frequency and/or the rotor angle to be directly determined in high quality.

In a further embodiment variant, the control device contains at least one meter and/or one detector, in particular a peak detector, which can be used to determine a number of maxima of the determined electric current and/or a time interval between at least two adjacent maxima of the temporal course of the electric current. A corresponding meter or counter can also be used to determine the time between the zero crossings of the electric current. The rotor angle, for example, can be determined on the basis of the temporal position of the maxima. On the basis of the interval between at least two adjacent maxima, it is easily possible to determine the rotor frequency or the rotational speed of the rotor.

In an embodiment variant, the rotor frequency and/or the rotor angle is determined when the rotor is stationary or when the rotor is rotating relative to the stator. The method is characterized in that the rotor frequency and/or the rotor angle can be performed with both a stationary rotor and a rotating rotor. The rotor frequency and/or the rotor angle can therefore be determined irrespective of the current operating state of the reluctance machine.

In an embodiment, a converter is connected to the reluctance machine in accordance with the rotor frequency and/or the rotor angle that has been determined. On the basis of the rotor frequency and/or the rotor angle that has been determined, the connection of the converter to the rotating reluctance machine can take place. The converter can therefore be electrically connected to the reluctance machine at the correct rotational speed and phase in a simple and reliable manner.

An inventive control device for a converter of a reluctance machine is so configured as to carry out a method according to the invention. Such a control device can comprise a corresponding signal processor, for example. Corresponding control code can run on the control device. It is thereby possible to provide a control device for a converter of a reluctance machine in a simple and economical manner.

An inventive drive assembly comprises a reluctance machine, a converter which is electrically connected to the reluctance machine, and an inventive control device for controlling the converter. In particular, the reluctance machine is designed as a synchronous reluctance machine without amortisseur. The converter can be designed as a frequency converter in particular. Such a drive assembly can be used for pumps or ventilators, for example.

The preferred embodiment variants proposed in respect of the inventive method, and their advantages, apply correspondingly to the inventive control device and to the inventive drive assembly.

Further features of the invention are derived from the claims, the figures and the description of the figures. All of the features and combinations of features cited in the description above and all of the features and combinations of features cited in the description of the figures below and/or shown in the figures alone are applicable not only in the respectively specified combination in each case, but also in other combinations or singly.

BRIEF DESCRIPTION OF THE DRAWINGS

The invention is now explained in greater detail on the basis of a preferred exemplary embodiment and with reference to the appended drawings, in which.

DETAILED DESCRIPTION OF THE EMBODIMENTS

It is intended here to determine a rotor frequency f and/or a rotor angle $\varphi$ of a reluctance machine 2. The reluctance machine 2 is designed in particular as a synchronous reluctance machine without amortisseur. The reluctance machine 2 comprises a stator (not shown) having corresponding stator windings 10. The reluctance machine 2 also comprises a rotor (not shown) having a rotor core that is so designed as to be magnetically anisotropic. The rotor core can be made of a laminated core and have corresponding flux blocking elements, i.e. air-filled regions or voids, whereby the magnetically anisotropic embodiment is produced. On the basis of the rotor frequency f and/or the rotor angle $\varphi$ that has been determined, in particular a converter 6 can be connected to the rotating reluctance machine 2 at the correct rotational speed and phase.

Figure 1:
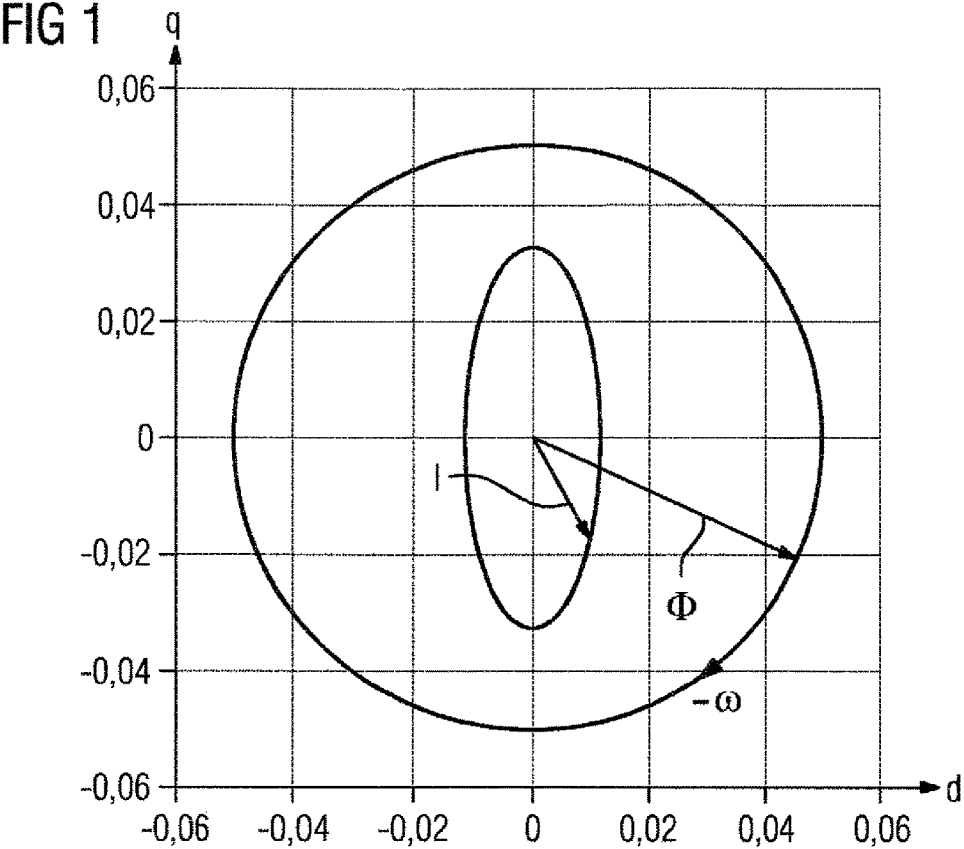
FIG. 1 shows a rotor coordinate system of a reluctance machine, in which a current vector and a flux vector are illustrated with their trajectories.

FIG. 1 shows a rotor coordinate system having the axis d and the axis q. In the rotor coordinate system, physical variables of the reluctance machine 2 are represented as vectors in the complex plane. The axis d shows the real part of the rotor coordinate system and in the direction of the high permeance. The axis q shows the imaginary part of the rotor coordinate system and in the direction of the low permeance. In the present exemplary embodiment, the rotor rotates at the frequency $\omega$. In the rotor coordinate system, a magnetic flux $\varphi$ is drawn as a flux vector. The flux vector is so impressed here as to be fixed relative to the stator. With ideal linear observation, the flux $\varphi$ or the flux vector in the rotor coordinate system appears on a circular trajectory rotating at the frequency $-\omega$.

As a result of the flux $\varphi$, an electric current I is produced in the stator winding 10. The rotor of the reluctance machine 2 or the rotor core thereof has a magnetic anisotropy, i.e. the rotor has a direction-dependent permeance. By virtue of this property, an impressed flux $\varphi$ which advances on a circular trajectory relative to the rotor results in a corresponding path of a current vector which describes the electric current I. The path of the current I or the current vector is derived from the geometric embodiment and/or the magnetic anisotropy of the rotor core. In the present exemplary embodiment, an elliptical path of the current vector is produced with regard to the rotor system.

Figure 2:
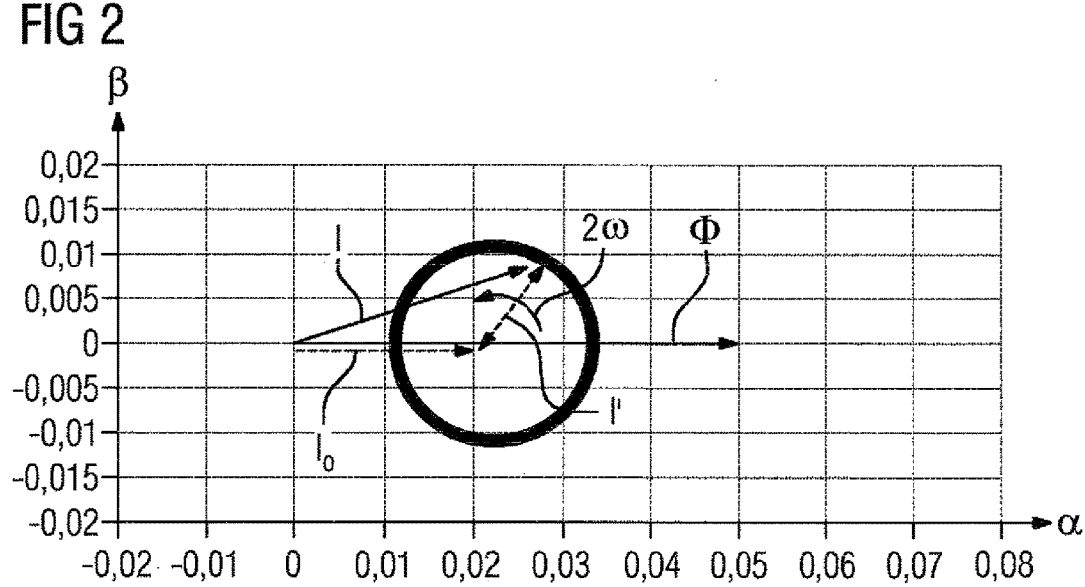
FIG. 2 shows a stator coordinate system of the reluctance machine, in which the current vector and the flux vector are illustrated with their trajectories.

FIG. 2 shows the courses as per FIG. 1 from the perspective of the flux vector, i.e. in the stator coordinate system. The stator coordinate system has the axis $\alpha$ and the axis $\beta$. The axis $\alpha$ shows the real part and the axis $\beta$ shows the imaginary part of the stator coordinate system. The flux vector or the flux $\varphi$ appears stationary in this case. The current vector describing the electric current I can be broken down into a positive-phase component $I_0$ and a negative-phase component $I'$. The positive-phase component $I_0$ is in phase with the flux $\varphi$. The negative-phase component $I'$ rotates in the direction of the running rotor at double the frequency $2\omega$. The temporal change of the electric current I is produced by the temporal change of the negative-phase component $I'$.

Figure 3:
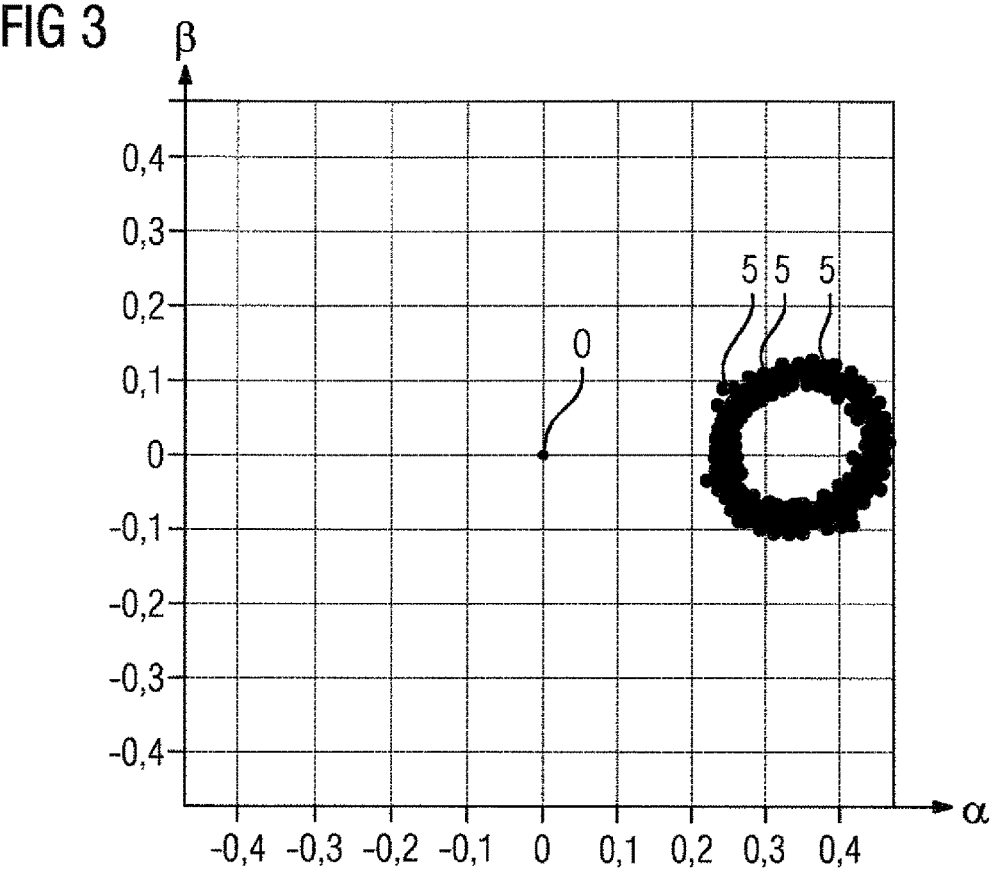
FIG. 3 shows the stator coordinate system, in which measured values for the electric current are recorded.

FIG. 3 shows a sequence of measured values 5 for the electric current I in the stator coordinate system. In the reluctance machine 2, the flux $\varphi$ is generated e.g. as a high-frequency sequential pulse train $\{\varphi_k\}$ with constant direction. The notation of the pair of braces is used to describe a sequence here. For this purpose, a voltage value of fixed amount and fixed direction and a pulse block $\{U_k, Z_k\}$ are output alternately in each case in sequential repetition by means of a frequency converter. The flux vector is created when voltage $U_k$ is applied, and decays again in the next cycle when the pulse block $Z_k$ is applied. In this way, the required pulse train for the flux $\{\varphi_k\}$ is quasi shot into the machine in sequential repetition.

A diagram of the resulting stator current pulse train $\{I_k\}$ is shown on the basis of the measured values 5. The measured values 5 form a circular trajectory in the stator coordinate system, with offset displacement $I_0$ relative to the origin O. The offset displacement is caused by the positive-phase component $I_0$ of the electrical current $I_k$. The associated circular trajectory is caused by the negative-phase component $I'$ and contains the information for the rotor angle $\varphi$. If the positive-phase component $I_0$ or offset displacement is known, the rotor angle $\varphi$ and/or the rotor frequency f can therefore be determined from the measured values 5 of the current $\{I_k\}$ after subtracting $I_0$.

The offset displacement can either be calculated in advance if the motor parameters are known, or determined in advance by arithmetic averaging of the measured values 5 if the motor parameters are not known. Alternatively, it can be determined in advance by generating the average from the minimum and the maximum of the measured values 5.

Figure 4:
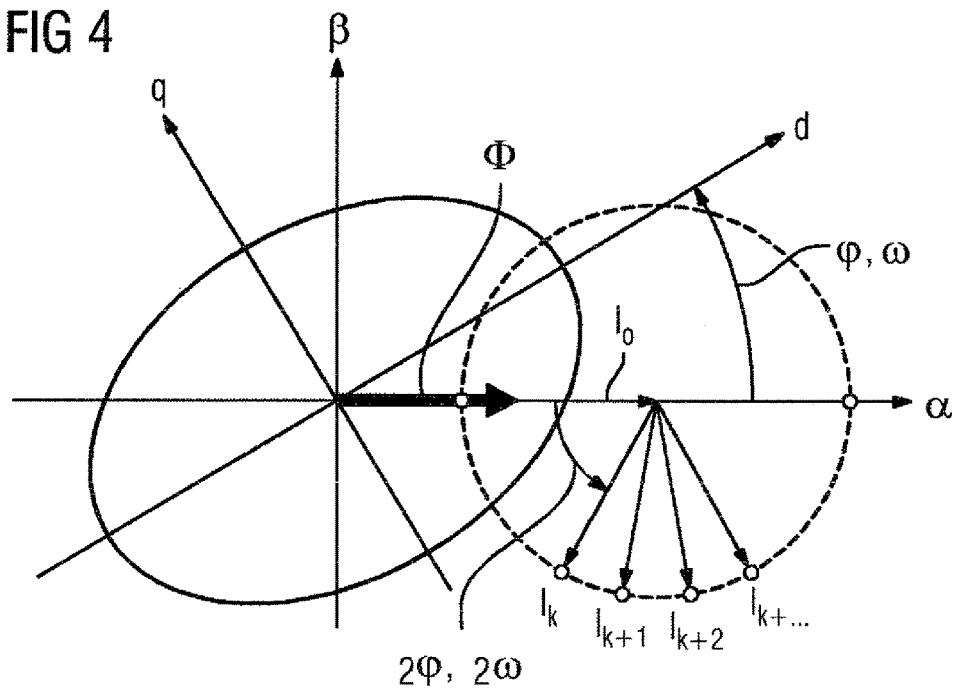
FIG. 4 shows the stator coordinate system and the rotor coordinate system of the reluctance machine.

FIG. 4 shows a space vector illustration of the reluctance machine 2. The space vector illustration comprises the stator coordinate system and the rotor coordinate system rotating relative to the stator coordinate system. It can be seen here that the sequence of voltage pulses $\{U_k, Z_k\}$ results in the generation of a flux $\varphi$ or a flux vector which is fixed relative to the stator and has a fixed direction relative to the axis $\alpha$. The voltage pulses $\{U_k, Z_k\}$ result in a sequence of current vectors $\{I_k\}$ whose values $I_k, I_{k+1}, I_{k+2}$ lie on a circle with offset displacement. The sequence of the negative-phase component $\{I'_k\}=\{I_k\}-I_0$, which is produced after subtracting the offset $I_0$ from $\{I_k\}$ and is marked in the diagram by the connecting vectors from $I_0$ to the values $I_k$, contains respectively the information for the doubled rotor angle $\varphi$ and the information for the doubled rotor frequency f as shown.

Figure 5:
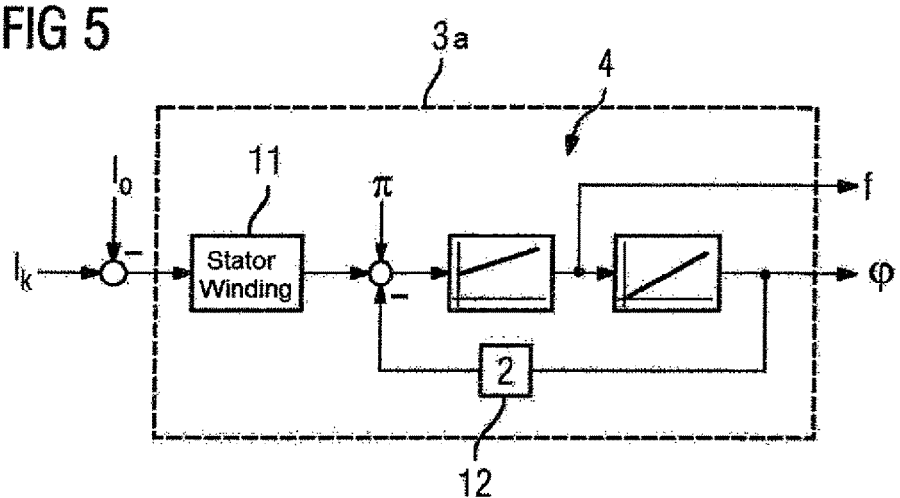
FIG. 5 shows an evaluating device of a drive assembly.

FIG. 5 shows a schematic illustration of an evaluating device 3a for determining the rotor frequency f and/or a rotor angle $\varphi$. The evaluating device 3a is supplied with the temporal response sequence of the electric current $\{I_k\}$ which is captured using a current sensor 7 for example. Furthermore, the offset displacement $I_0$ is subtracted from the electric current $\{I_k\}$. Therefore the sequence of the negative-phase component $\{I'_k\}$ of the electric current $\{I_k\}$ is supplied to a phase control loop 4. The phase control loop 4 is clocked at the frequency of the voltage signal $\{U_k\}$ in particular. The angle argument of the temporal course of the negative-phase component $\{I'_k\}$ can be determined by means of a device 11. An offset angle $\Pi$ is also added to the angle argument. Furthermore, the device 12 is used to reduce the current angle and the current frequency by the factor 2. The rotor frequency f and the rotor angle $\varphi$ can thus be determined by the phase control loop 4.

Figure 6:
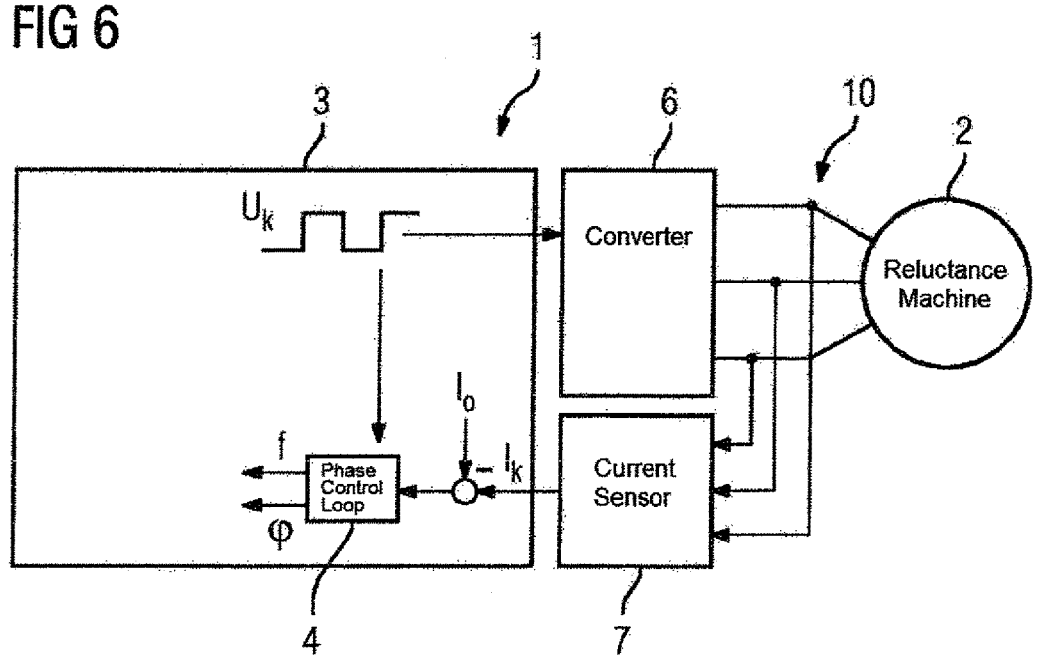
FIG. 6 shows the drive assembly with the reluctance machine, a converter, a measuring device and the control device.

FIG. 6 shows a drive assembly 1 in a first embodiment variant. The drive assembly 1 comprises the reluctance machine 2. The drive assembly 1 also comprises the control device 3. The drive assembly 1 further comprises the converter 6, which is designed as a frequency converter in particular. The converter 6 is electrically connected to the stator winding 11. In the present exemplary embodiment, the stator winding 11 has three phases. The voltage pulses $U_k$ are now impressed into the stator winding 11. These give rise to the electric current I in the stator winding 10, which is captured by the current sensor 7.

Figure 7:
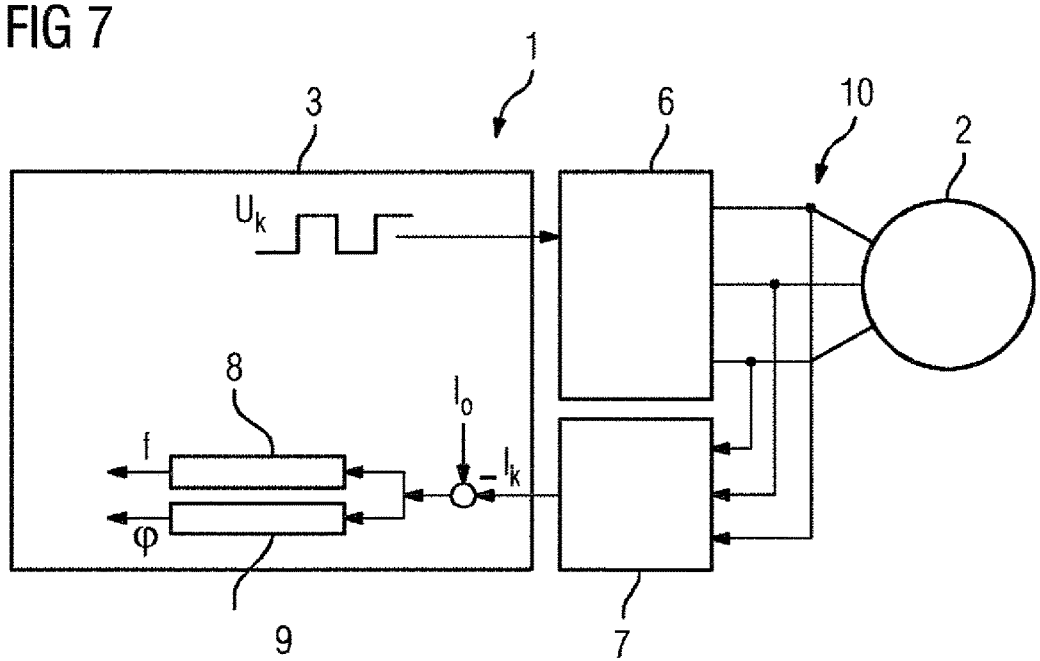
FIG. 7 shows the drive assembly according to FIG. 6 in a further embodiment variant.

FIG. 7 shows the drive assembly 1 in a further embodiment variant. Instead of the phase control loop 4, provision is made for a corresponding meter 8 which can determine the time between the zero crossings of the temporal course of the electric current I and can therefore determine the rotor frequency f. Provision is also made for a detector 9, in particular a max/min detector, which can determine the rotor angle φ or the phase on the basis of the maximum values of the electric current I.

Using the drive assemblies 1 according to FIG. 6 and FIG. 7, the rotor frequency f and the rotor angle φ can be reliably determined. Assuming a frequency of the voltage $U_k$ of 1 kHz and an identification duration of 50 ms, for example, a rotor frequency f from 0 Hz to approximately ±100 Hz can be determined. At a higher frequency, the performance characteristics can be increased.

By virtue of the low signal energy, the method for determining the rotor frequency f and/or the rotor angle φ is quasi noiseless and torque-free. Furthermore, the converter 6 can be connected to the rotating reluctance machine 2 at the correct rotational speed and phase.

The invention claimed is:

1. A method, comprising:
    applying a temporal sequence of voltage pulses to a stator winding of a stator of a reluctance machine via a frequency converter by alternately outputting a voltage value of a fixed amount and a fixed direction and a pulse block in a sequential repetition; and
    determining a rotor frequency and/or a rotor angle of a rotor of the reluctance machine by measuring a sequential pulse response of an electric current by using an evaluating device, said electric current having a negative-phase component representing a part of the electric current changing as a function of the rotor angle and a positive-phase component representing a part of the electric current not undergoing a change as a function of the rotor angle, wherein the sequential pulse response of the electric current, which flows in the stator winding is generated as a result of the voltage pulses, and a flux is thereby sequentially generated from the voltage pulses as a result of the rotor having a magnetically anisotropic rotor core.

2. The method of claim 1, wherein the rotor frequency and/or the rotor angle is determined based on a geometry of the rotor core.

3. The method of claim 1, further comprising preparing a phase and/or a frequency of a temporal course of the electric current using a phase control loop of a control device.

4. The method of claim 3, wherein the control device has at least one meter and/or one detector used for determining maximum values for the measured electric current and/or a time interval between at least two adjacent maxima of the temporal course of the electric current.

5. The method of claim 1, wherein the rotor frequency and/or the rotor angle is determined when the rotor is stationary or when the rotor is rotating relative to the stator.

6. The method of claim 1, wherein a converter is connected to the reluctance machine based on the determined rotor frequency and/or the rotor angle.

7. A control device for a converter of a reluctance machine, comprising:
    at least one meter and/or one detector for determining a rotor frequency and/or a rotor angle of a rotor of the reluctance machine, said at least one meter and/or one detector determining maximum values for a measured electric current and/or a time interval between at least two adjacent maxima of a temporal course of the electric current, said control device, by operating the at least one meter and/or the one detector is configured to:
    apply a temporal sequence of voltage pulses to a stator winding of a stator of the reluctance machine via a frequency converter by alternately outputting a voltage value of a fixed amount and a fixed direction and a pulse block in a sequential repetition; and
    determine the rotor frequency and/or the rotor angle of the rotor of the reluctance machine by measuring a sequential pulse response of the electric current via an evaluating device, said electric current having a negative-phase component representing a part of the electric current changing as a function of the rotor angle and a positive-phase component representing a part of the electric current not undergoing a change as a function of the rotor angle, wherein the sequential pulse response of the electric current, which flows in the stator winding is generated as a result of the voltage pulses, and a flux is thereby sequentially generated from the voltage pulses as a result of the rotor having a magnetically anisotropic rotor core.

8. A drive assembly, comprising:
    a reluctance machine;
    a converter electrically connected to the reluctance machine; and
    a control device for controlling the converter, said control device including at least one meter and/or one detector for determining a rotor frequency and/or a rotor angle of a rotor of the reluctance machine, said at least one meter and/or one detector determining maximum values for a measured electric current and/or a time interval between at least two adjacent maxima of a temporal course of the electric current, said control device, by operating the at least one meter and/or the one detector is configured to:
    apply a temporal sequence of voltage pulses to a stator winding of a stator of the reluctance machine via a frequency converter by alternately outputting a voltage value of a fixed amount and a fixed direction and a pulse block in a sequential repetition; and
    determine the rotor frequency and/or the rotor angle of the rotor of the reluctance machine by measuring a sequential pulse response of the electric current via an evaluating device, said electric current having a negative-phase component representing a part of the electric current changing as a function of the rotor angle and a positive-phase component representing a part of the electric current not undergoing a change as a function of the rotor angle, wherein the sequential pulse response of the electric current, which flows in the stator winding is generated as a result of the voltage pulses, and a flux is thereby sequentially generated from the voltage pulses as a result of the rotor having a magnetically anisotropic rotor core.

* * * * *